United States Patent
Kanaya et al.

(10) Patent No.: US 6,379,441 B1
(45) Date of Patent: Apr. 30, 2002

(54) INK COMPOSITION REALIZING IMAGES WITH EXCELLENT LIGHT RESISTANCE AND INK SET

(75) Inventors: Miharu Kanaya; Jun Ito, both of Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 09/424,464

(22) PCT Filed: Mar. 26, 1999

(86) PCT No.: PCT/JP99/01577

§ 371 Date: Nov. 23, 1999

§ 102(e) Date: Nov. 23, 1999

(87) PCT Pub. No.: WO99/50363

PCT Pub. Date: Oct. 7, 1999

(30) Foreign Application Priority Data

| Mar. 26, 1998 | (JP) | 10-079125 |
| Mar. 26, 1998 | (JP) | 10-079126 |
| Apr. 8, 1998 | (JP) | 10-096407 |
| May 6, 1998 | (JP) | 10-123757 |

(51) Int. Cl.$^7$ ............................................. C09D 11/02
(52) U.S. Cl. .............. 106/31.49; 106/31.27; 106/31.43; 106/31.36; 106/31.58
(58) Field of Search ............... 106/31.27, 31.49, 106/31.58, 31.43, 31.36

(56) References Cited

U.S. PATENT DOCUMENTS

| 4,756,963 A | | 7/1988 | Yamamoto ................... 428/334 |
| 5,123,960 A | * | 6/1992 | Shirota et al. ............ 106/31.49 |
| 5,954,866 A | * | 9/1999 | Ohta et al. ................ 106/31.89 |
| 6,039,793 A | * | 3/2000 | Gundlach et al. ......... 106/31.58 |

FOREIGN PATENT DOCUMENTS

| JP | 56024472 | 3/1981 | |
| JP | 62-106971 | 5/1987 | ........... C09D/11/00 |
| JP | 1152175 | 6/1989 | |
| JP | 3185080 | 8/1991 | |
| JP | 5059316 | 3/1993 | |
| JP | 9188062 | 7/1997 | |

OTHER PUBLICATIONS

JPO Abstract 62(1987)–106971, May 18, 1987.
Patent Abstract of JP 03185080 Filed Aug. 13, 1991.
Patent Abstract of JP 01152175 Filed Jun. 14, 1989.
Patent Abstract of JP 56024472 Filed Mar. 9, 1981.
Patent Abstract of JP 09188062 Filed Jul. 22, 1997.
Patent Abstract of 05059316 Filed Mar. 9, 1993.

* cited by examiner

Primary Examiner—Helene Klemanski
(74) Attorney, Agent, or Firm—Ladas & Parry

(57) ABSTRACT

Disclosed are a cyan ink containing a copper phthalocyanine dye which can realize images much less susceptible to deterioration upon exposure to visible light, a yellow or magenta ink, to be used with a cyan ink containing a copper phthalocyanine dye, capable of realizing color images much less susceptible to deterioration upon exposure to visible light, and an ink set comprising at least a cyan ink, a yellow ink, and a magenta ink and capable of realizing color images much less susceptible to deterioration upon exposure to visible light. The copper phthalocyanine dye undergoes color change and fading upon exposure to visible light. This is considered attributable to deterioration and decomposition of the dye by photo-oxidation or photo-reduction. Incorporation of an imidazole derivative and an antioxidant, a saccharide, or a compound represented by formula (I) or incorporation of a water-soluble organonickel compound into the ink can effectively prevent the color change and fading of the copper phthalocyanine dye. The addition of the above compounds to the cyan ink containing a copper phthalocyanine dye or the ink to be used with the cyan ink containing a copper phthalocyanine dye can provide inks which have high color development and vividness of single colors and have excellent lightfastness. Further, use of an ink set comprising this ink can provide color images which are vivid and highly fast to light even at a portion of a mixed color of this ink and an ink having a different hue.

29 Claims, No Drawings

INK COMPOSITION REALIZING IMAGES WITH EXCELLENT LIGHT RESISTANCE AND INK SET

BACKGROUND OF THE INVENTION

1. Field of the Invention

The present invention relates to a cyan ink composition capable of realizing images having excellent lightfastness and an ink set capable of realizing color images having excellent lightfastness.

2. Background Art

Ink jet recording is a recording method wherein a recording liquid is ejected, through fine nozzles provided in a recording head, by vibration utilizing a piezoelectric element, action of heat energy or the like to perform recording. This recording method has advantages including quietness during recording and formation of high-resolution images at a high speed and low running cost by virtue of use of a high-density head. This has led to utilization of the ink jet recording in various recording fields, such as printers for personal computers, video printers, and printers for graphics.

In the formation of color images, at least three colors of magenta ink, yellow ink, and cyan ink are generally used. In particular, in ink jet recording, these three colors and, if necessary, four colors of these three colors and additionally black ink are provided, and the ejection of each ink is controlled by an electric signal to adjust the mixing ratio of the colors, thereby performing multi-color rendering. For example, red is produced by magenta ink and yellow ink. A variation in ejection ratio of the magenta ink and the yellow ink can create a change in mixing ratio of colors to render subtle gradation of red. Likewise, blue is rendered by color mixing of cyan ink and magenta ink, and green is rendered by color mixing of yellow ink and cyan ink. Further, a method has also been proposed wherein a light color ink having lower color density is used in addition to these three or four colors to improve color gradation, thereby further enhancing color rendering.

Inks used in the ink jet recording are required to have properties, for example, such that the values of properties, such as viscosity and surface tension, are proper, the optical density is high, vivid color tones and images can be provided, images having excellent fastness properties, such as excellent waterfastness and lightfastness can be produced, the storage stability is excellent, nozzles are less likely to be clogged, a bad smell is less likely to be emitted, and the safety in terms of hazard associated with fire fighting is high. Most of these requirements are satisfied by water-base inks prepared by dissolving a water-soluble dye in water or a mixed solution composed of water and a water-soluble organic solvent, and inks having various hues may be prepared from dyes having various hues.

Dyes, however, are known to be deteriorated by ultraviolet light in the sunlight and consequently to cause color change and fading. Therefore, various dyes, additives and the like have been studied in order to improve the lightfastness.

In the case of ink jet recording, the ejected ink penetrates into a recording medium, while the dye is merely adsorbed onto the recording medium. Thus, unlike silver salt photography and heat fusing methods, the dye is not protected by a binder, a cover film or the like. Therefore, recorded images (that is, dyes) are exposed directly to light, such as sunlight and light from fluorescent lamps, and, at the same time, are always exposed to oxygen, water, gases and the like contained in the air.

Methods for improving the lightfastness have been proposed such as a method wherein dyes, with specific structures, possessing excellent lightfastness are used, and a method wherein ultraviolet absorbers and light stabilizers are added to the ink to prevent color change and fading of dyes. Further, Japanese Patent Laid-Open No. 106971/1987 proposes, for example, a method wherein an ultraviolet absorber and an antioxidant are added to the ink to improve the lightfastness. However, some dyes possessing excellent fastness to ultraviolet light have undergone color change and fading under actual environment containing visible light. Further, some dyes possessing excellent lightfastness under environment containing the visible region have undergone color change and fading upon color mixing with other dyes. Further, it was found that although the proposed additives have the effect of preventing color change and fading of dyes caused by ultraviolet light, the effect is unsatisfactory under actual environment containing visible light.

Japanese Patent Publication No. 53436/1994 proposes a method for protecting dyes wherein a PET (polyethylene terephthalate) film containing an ultraviolet absorber and the like is laminated onto recorded images. The lamination, however, often sacrifices the sharpness of images and necessitates the provision of the additional step of lamination after printing, that is, lacks in simpleness, and thus is not a useful method. The lamination is effective in preventing color change and fading of the dye caused by ultraviolet light. However, it was found that this effect is unsatisfactory under actual environment containing visible light.

The deterioration in images caused by visible light is believed to be attributable to color change and fading of dyes caused by visible light. More specifically, the deterioration is considered to be attributable to deterioration or decomposition of dyes by photo-oxidation or photo-reduction. In particular, oxygen molecules in the air are converted to singlet oxygen ($^1O_2$) due to interaction between oxygen molecules and dye molecules, and the singlet oxygen often attacks the dye molecules and deteriorates and decomposes them. Specifically, some dyes per se function as a sensitizer of the singlet oxygen in the presence of light and oxygen. This leads to the formation of singlet oxygen which oxidizes the dyes per se. That is, the dyes are deteriorated by autosensitization. Further, in the case of ink jet recording wherein inks having different hues are ejected at an adjusted ejection ratio (that is, color mixing ratio) to perform multi-color rendering, it is considered that some dyes function as a sensitizer of singlet oxygen, i.e., as a catalyst, and the resultant singlet oxygen is reacted with contiguous or mixed other dye to cause color change and fading of the dye, that is, to accelerate the deterioration and decomposition of the dye.

Copper phthalocyanine dyes are generally used as the colorant of the cyan ink from the viewpoint of lightfastness, vividness and the like. The present inventors have confirmed that the copper phthalocyanine dyes function as a sensitizer of singlet oxygen. They have further found such a tendency that some colorants, especially magenta dyes, are likely to be deteriorated by the singlet oxygen, resulting in significant color change and fading at a portion where the cyan ink is contiguous with or mixed with other color, particularly magenta ink.

Magenta dyes, which are likely to cause color change and fading by attack of the singlet oxygen, are particularly azo dyes. On the other hand, many azo dyes possess excellent vividness and lightfastness. That is, single-color images of magenta ink possess excellent lightfastness, but on the other hand, the color change and fading at a portion of a mixed color of the magenta ink and the ink containing a copper phthalocyanine dye are significant. Consequently, the lightfastness of the color image is poor as a whole.

So far as the present inventors know, copper phthalocyanine dyes, which do not accelerate the photodeterioration of magenta dyes and are excellent in both vividness and lightfastness, have not been found, and, in addition, colorants, particularly magenta dyes, which do not cause photodeterioration at a portion of a mixed color of the colorant and the copper phthalocyanine dye and are excellent in both vividness and lightfastness, have also not been found.

SUMMARY OF THE INVENTION

According to the first aspect of the present invention, a cyan ink composition containing a copper phthalocyanine dye is provided which can realize images much less susceptible to color change and fading upon exposure to visible light at a portion of a mixed color of a copper phthalocyanine dye and other colorant.

According to the second aspect of the present invention, there are provided yellow and magenta ink compositions, to be used with the ink composition containing a copper phthalocyanine dye, which can realize images much less susceptible to color change and fading upon exposure to visible light at a portion of a mixed color of the yellow or magenta ink composition and the cyan ink composition.

According to the third aspect of the present invention, there is provided an ink set comprising at least a cyan ink composition, a yellow ink composition, and a magenta ink composition and capable of realizing images much less susceptible to color change and fading upon exposure to visible light.

The cyan ink composition according to the present invention comprises at least a copper phthalocyanine dye, water, an organic solvent, and an imidazole derivative or a water-soluble organonickel compound, with the proviso that, when the imidazole derivative is contained, said cyan ink composition further comprises an antioxidant, a saccharide, or a compound represented by formula (I):

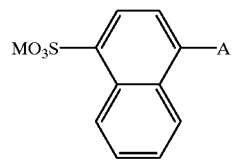

(I)

wherein

A represents a hydroxyl or amino group, said amino group being optionally substituted by a $C_{1-6}$ alkyl, a $C_{1-6}$ alkoxy, or a hydroxy $C_{1-6}$ alkyl; and M represents lithium, sodium, potassium, ammonium, or a mono- or di-$C_{1-6}$ alkylamino.

The yellow or magenta ink composition to be used with the ink composition containing a copper phthalocyanine dye according to the present invention comprises at least a yellow dye or a magenta dye, water, and an organic solvent and, in addition, an imidazole derivative or a water-soluble organonickel compound, provided that when the imidazole derivative is contained, said ink composition further comprises an antioxidant, a saccharide, or the compound represented by formula (I).

The ink set according to the present invention comprises the above cyan ink composition according to the present invention and/or the above yellow ink composition or magenta ink composition according to the present invention.

The ink compositions and the ink set according to the present invention can provide single colors possessing excellent color development, vividness, and lightfastness and, in addition, can yield color images which are vivid and highly fast to light even at a portion of a mixed color of this ink and an ink having a different hue. Further, the ink compositions and ink set according to the present invention are suitable for use in ink jet recording and, when printed on various recording media including paper and resin films, can yield vivid and highly lightfast color images.

DETAILED DESCRIPTION OF THE INVENTION

The ink compositions and ink set according to the present invention may be used in recording methods using an ink composition. Recording methods using an ink composition include, for example, an ink jet recording method, a recording method using writing utensils, such as pens, recorders, pen plotter, and other various printing methods. Particularly preferably, the ink compositions and ink set according to the present invention can be used in the ink jet recording method wherein a recording liquid is ejected through fine nozzles provided in a recording head to perform recording. The ink jet recording method is not particularly limited. In particular, however, excellent image recording can be carried out in a method wherein droplets are ejected utilizing vibration of a piezoelectric element and a method using heat energy.

Cyan ink composition

The cyan ink composition according to the first aspect of the present invention comprises at least a copper phthalocyanine dye, water, an organic solvent, and an imidazole derivative or a water-soluble organonickel compound. When the imidazole derivative is contained, the ink composition further comprises an antioxidant, a saccharide, or the compound represented by formula (I).

The incorporation of the imidazole derivative and the antioxidant, the saccharide, or the compound represented by formula (I) or the incorporation of the water-soluble organonickel compound can effectively prevent color change and fading upon exposure to visible light at a portion where the ink containing a copper phthalocyanine dye is in contact with or in the state of a mixture with other color ink. Although the reason for this has not been fully elucidated yet, it is believed to reside in that the above group of compounds serves to inhibit the function of the copper phthalocyanine dye as a sensitizer of singlet oxygen or to cause extinction of the resultant singlet oxygen.

(a) Copper phthalocyanine dye

The copper phthalocyanine dye used in the present invention refers to a compound having a copper phthalocyanine skeleton represented by formula

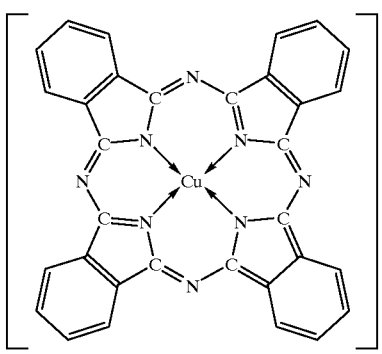

According to a preferred embodiment of the present invention, examples of preferred copper phthalocyanine dyes include C.I. Acid Blue 249, C.I. Direct Blue 86, 87, and 199, and, in addition, water-soluble copper phthalocyanine dyes represented by formula (a)

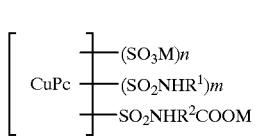
(a)

wherein

CuPc represents the phthalocyanine skeleton as defined above;

$R^1$ represents a hydrogen atom, a $C_{1-10}$ alkyl group, a $C_{1-10}$ alkoxy group, or a hydroxy $C_{1-10}$ alkyl group;

$R^2$ represents a $C_{1-10}$ alkylene group, a $C_{1-10}$ alkyleneoxy $C_{1-10}$ alkylene group, or a substituted triazine group;

M represents lithium, sodium, potassium, ammonium, or mono- or di-$C_{1-6}$ alkylamino; and n and m are each an integer of 0 to 4, provided that n+m is an integer of not more than 4.

Specific examples of preferred compounds represented by formula (a) include the following compounds:

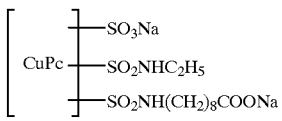
(a-1)

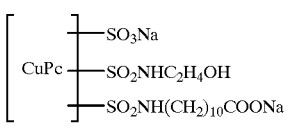
(a-2)

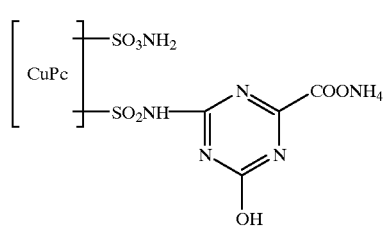
(a-3)

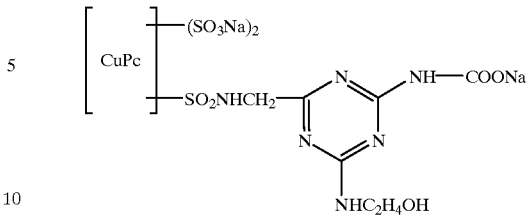
(a-4)

According to the ink composition of the present invention, the amount of the copper phthalocyanine dye added is preferably in the range of 0.1 to 10% by weight.

(b) Imidazole derivative

The imidazole derivative contained in the cyan ink composition according to the present invention refers to an imidazole which may be substituted by a hydroxyl, carboxyl, or $C_{1-6}$ alkyl group. Examples of preferred imidazole derivatives include imidazole, N-methylimidazole, 2-methylimidazole, 2-hydroxyimidazole, 4-hydroxyimidazole, 5-hydroxyimidazole, pyrimidazole, 2-ethylimidazole, 2-ethyl-4-methylimidazole, histamine, histidine, imidazolyl acetic acid, 4-methylimidazole, 4-imidazolyl acrylic acid, 4,5-imidazolyl dicarboxylic acid, and pilocarpine. These imidazole derivatives may be used alone or as a mixture of two or more.

The amount of the imidazole derivative added may be properly determined in such an amount range as will provide the above effect. The amount, however, is preferably 1 to 40% by weight, more preferably 1 to 30% by weight.

When the ink composition of the present invention contains the imidazole derivative, the ink composition further comprises an antioxidant, a saccharide, or a compound represented by formula (I).

Antioxidant

According to the present invention, the antioxidant is preferably selected from the group consisting of erythorbic acid, sodium erythorbate, L-ascorbic acid, sodium L-ascrobate, water-soluble derivatives of dibutylhydroxytoluene, and water-soluble derivatives of butylhydroxyanisole. Commercially available antioxidants may also be used, and examples thereof include Sumilizer TL (a product of Sumitomo Chemical Co., Ltd.), Sumilizer GD (a product of Sumitomo Chemical Co., Ltd.), ADK STAB LX-45 (a product of Asahi Denka Kogyo Ltd.), ADK STAB LX-141 (a product of Asahi Denka Kogyo Ltd.), and ADK STAB LX-802 (a product of Asahi Denka Kogyo Ltd.). These antioxidants may be used alone or as a mixture of two or more.

Although the amount of the antioxidant added may be properly determined in such an amount range as will provide that above effect, the amount is preferably 0.1 to 10% by weight.

Saccharide

According to the present invention, preferred saccharides include monosaccharides, disaccharides, oligosaccharides (including trisaccharides and tetrasaccharides), polysaccharides, and derivatives thereof. Examples of preferred saccharides include glucose, mannose, fructose, ribose, xylose, arabinose, galactose, glucitol (sorbit), maltose, cellobiose, lactose, sucrose, trehalose, and maltotriose. Derivatives of these saccharides usable herein include reducing sugars of the above saccharides (for example, sugar alcohols and deoxysugar), oxidizing sugars (for example, aldonic acid, glucaric acid, and uronic acid), dehydrated saccharide derivatives (for example, glycoseen), amino sugar, and thio sugar. These saccharides may be used alone or as a mixture of two or more.

The amount of the saccharide added may be properly determined in such an amount range as will provide the above effect. The amount, however, is preferably 1 to 10% by weight.

Compound represented by formula (I)

In formula (I), A represents a hydroxyl or amino group, the amino group being optionally substituted by a $C_{1-6}$ alkyl (preferably $C_{1-4}$ alkyl), a $C_{1-6}$ alkoxy (preferably $C_{1-4}$ alkoxy), or a hydroxy $C_{1-6}$ alkyl (preferably hydroxy $C_{1-4}$ alkyl); and M represents lithium, sodium, potassium, ammonium, or a mono- or di-$C_{1-6}$ alkyl(preferably $C_{1-4}$ alkyl)amino.

Specific examples of preferred compounds represented by formula (I) according to the present invention include compounds having the following A/M combination.

|  | A | M |
| --- | --- | --- |
| Compound (I-1) | —OH | Na |
| Compound (I-2) | —NH$_2$ | Na |
| Compound (I-3) | —NHCOCH$_3$ | Li |
| Compound (I-4) | —NHC$_2$H$_4$OH | Na |
| Compound (I-5) | —N(C$_2$H$_5$OH)$_2$ | Na |

The amount of the compound represented by formula (I) added may be properly determined in such an amount range as will provide the above effect. The amount, however, is preferably 0.1 to 10% by weight.

(c) Water-soluble organonickel compound

The water-soluble organonickel compound contained in the cyan ink composition according to the present invention is preferably a nickel complex. Examples of ligands in the complex include ammonia, $C_{1-6}$ alkoxy, $C_{1-6}$ alkyl NH$_2$CO$_2$, and NH$_2$ $C_{1-6}$ alkyl CO$_2$. Preferred examples thereof include hexaamminenickel, bisacetylacetonatonickel, bisalaninatonickel, bisglycinatodiamminenickel, or nickel phthalocyanine compounds.

The amount of the water-soluble organonickel compound added may be properly determined in such an amount range as will provide the above effect. The amount, however, is preferably 0.1 to 5.0% by weight.

(d) Water, organic solvent, and other components

The cyan ink composition according to the present invention further contains water and an organic solvent as the solvent. The organic solvent is preferably a water-soluble organic solvent, and selection of a low-volatile solvent is preferred from the viewpoint of preventing clogging. Specific examples of preferred low-volatile solvents include: polyhydric alcohols, such as ethylene glycol, diethylene glycol, triethylene glycol, polyethylene glycol, propylene glycol, 1,3-propanediol, 1,5-propanediol, 1,2-hexanediol, 1,2,6-hexanetriol, and glycerin; glycol ethers, such as ethylene glycol monomethyl ether, ethylene glycol monobutyl ether, diethylene glycol monobutyl ether, triethylene glycol monoethyl ether, triethylene glycol monobutyl ether, propylene glycol monomethyl ether, propylene glycol monobutyl ether, and dipropylene glycol monomethyl ether; nitrogen-containing solvents, such as formamide, dimethylformamide, diethanolamine, triethanolamine, 1,3-dimethyl-2-imidazolidinone, 2-pyrrolidone, and N-methyl-2-pyrrolidone; and sulfur-containing solvents, such as thiodiglycol and dimethyl sulfoxide.

These solvents may be used alone or as a mixture of two or more. The amount of the solvent added to the ink composition may be properly determined. The amount, however, is generally about 3 to 40% by weight, preferably 3 to 30% by weight.

According to a preferred embodiment of the present invention, when the ink composition is used in multi-color ink jet recording, the addition of a glycol ether or an acetylene glycol nonionic surfactant is preferred from the viewpoint of preventing bleeding at boundary areas between contiguously printed color inks. More preferably, the incorporation of both the glycol ether and the acetylene glycol nonionic surfactant can realize very vivid color images. Particularly preferred are diethylene glycol monobutyl ether, triethylene glycol monobutyl ether, and propylene glycol monobutyl ether. The amount thereof added is preferably about 3 to 30% by weight. Further, commercially available acetylene glycol nonionic surfactants may also be utilized, and examples thereof include Olfine E1010, Olfine E104, and Olfine STG (products of Nissin Chemical Industry Co., Ltd.). The amount thereof added is preferably 0.1 to 3.0% by weight.

Further, the addition of a wetting agent, which is hygroscopic and solid at room temperature, such as urea, trimethylolethane, or trimethylolpropane, is also preferred from the viewpoint of preventing clogging. The amount of the wetting agent added is preferably about 2 to 20% by weight, more preferably 5 to 10% by weight.

In order to accelerate drying of the ink after the formation of an image, it is preferred to add lower alcohols, such as ethanol, 1-propanol, and 2-propanol, anionic surfactants, such as fatty acid salts and alkylsulfuric acid ester salts, and nonionic surfactants, such as acetylene glycols, polyoxyethylene alkyl ethers, and polyoxyethylene fatty acid esters. The content of the lower alcohol in the ink composition is generally about 2 to 10% by weight, preferably 2 to 6% by weight. The content of the surfactant is preferably 0.01 to 2% by weight.

If necessary, the ink composition according to the present invention may contain water-soluble polymers, water-soluble resins, antifoaming agents, pH adjustors, antimolds and the like.

The ink composition according to the present invention may be produced by a conventional method. For example, the ingredients are thoroughly mixed together to prepare a solution. The solution is filtered under pressure through a membrane filter having a pore diameter of 0.8 μm. The filtrate is deaerated by means of a vacuum pump to prepare an ink.

Yellow or magenta ink composition

The yellow or magenta ink composition according to the present invention is to be used with the cyan ink composition containing a copper phthalocyanine dye. The yellow or magenta ink composition according to the present invention is an ink composition comprising at least a yellow dye or a magenta dye, water, and an organic solvent and, in addition, an imidazole derivative or a water-soluble organonickel compound, provided that when the imidazole derivative is contained, the ink composition further comprises an antioxidant, a saccharide, or the compound represented by formula (I).

As described above, the incorporation of the imidazole derivative and the antioxidant, the saccharide, or the compound represented by formula (I) or the incorporation of the water-soluble organonickel compound can effectively prevent color change and fading of the copper phthalocyanine dye upon exposure to visible light. Therefore, according to this aspect of the present invention, a combination of the imidazole derivative and the antioxidant, the saccharide, or the compound represented by formula (I) or alternatively the water-soluble organonickel compound is added to a yellow ink composition and/or a magenta ink composition to be used with the cyan ink composition, rather than to the cyan ink composition containing a copper phthalocyanine dye.

The copper phthalocyanine dye causes significant color change and fading of particularly magenta dyes, especially water-soluble azo dyes. Specific examples of magenta dyes, which are likely to undergo significant color change and fading and permit the color change and fading to be significantly inhibited by the present invention, include C.I. Acid Red 1, 6, 8, 26, 32, 35, 37, 42, 85, 89, 106, 11, 114, 115, 129, 180, 249, and 254, C.I. Direct Red 2, 9, 23, 31, 75, 81, 84, 225, 227, and 254, C.I. Reactive Red 1, 3, 17, 81, and 180, and compounds represented by formula (b) or (c).

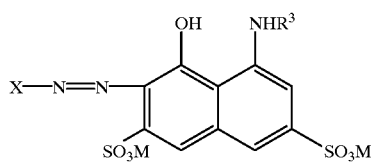

(b)

wherein
- X represents a phenyl or naphthyl group optionally substituted by a sulfonyl or carboxyl group;
- $R^3$ represents a hydrogen atom, a $C_{1-10}$ alkyl, $C_{1-10}$ alkoxy, or hydroxy $C_{1-10}$ alkyl group; and
- M represents lithium, sodium, potassium, ammonium, or mono- or di-$C_{1-6}$ alkylamino.

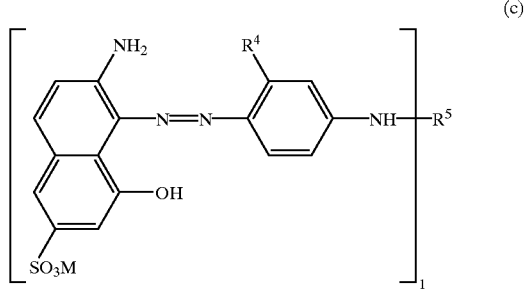

(c)

wherein
- 1 is 0 or 1;
- $R^4$ represents a sulfonyl or carboxyl group;
- $R^5$ represents an optionally substituted triazine group in the case of 1=0, and —CO— group in the case of 1=1; and
- M represents lithium, sodium, potassium, ammonium, or mono- or di-$C_{1-6}$ alkylamino.

Specific examples of compounds represented by formula (b) or (c) include the following compounds:

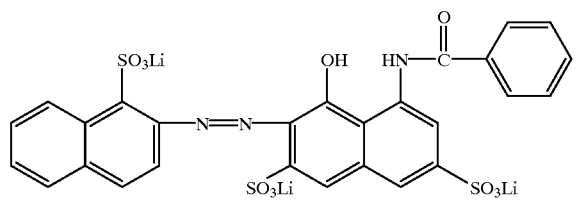

(b-1)

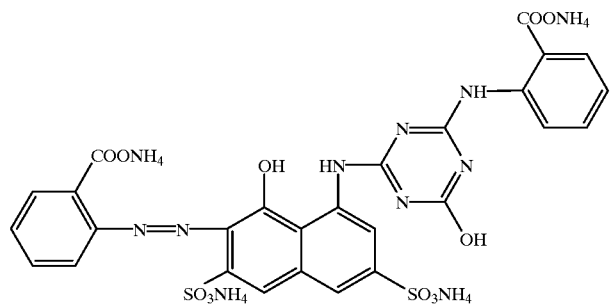

(b-2)

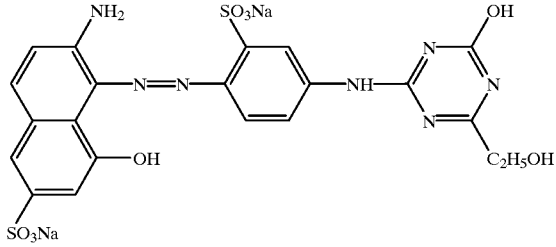

(b-3)

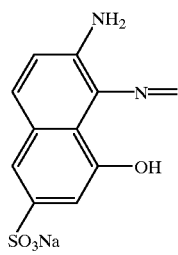 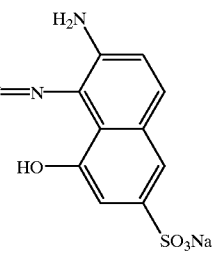

(b-4)

The amount of the magenta dye added is preferably 0.1 to 10% by weight.

The imidazole derivative, the antioxidant, the saccharide, the compound represented by formula (I), and the water-soluble organonickel compound contained in the yellow and magenta ink compositions according to the present invention and preferred examples thereof may be the same as those described above in connection with the cyan ink composition according to the present invention. This is true of other ink compositions.

Ink set

According to a further aspect of the present invention, there is provided an ink set comprising the cyan ink composition according to the present invention, a yellow ink composition, a magenta ink composition, and optionally a black ink composition.

According to a still further aspect of the present invention, there is provided an ink set comprising the yellow and magenta ink compositions according to the present invention, optionally a black ink composition, and a cyan ink composition containing a copper phthalocyanine dye and not containing an imidazole derivative, an antioxidant, a saccharide, a compound represented by formula (I), and a water-soluble organonickel compound.

According to another aspect of the present invention, there is provided an ink set comprising the cyan ink composition according to the present invention, the yellow and magenta ink compositions according to the present invention, and optionally a black ink composition.

Ink jet recording using these ink sets can realize very good color images free from color change and fading upon exposure to visible light.

According to a preferred embodiment of the present invention, the ink set may comprise two ink compositions which have the same color but are different from each other in color density. For example, the ink set may comprise ink compositions of six colors, that is, five colors of a yellow ink composition, two magenta ink compositions different from each other in color density, and two cyan ink compositions different from each other in color density, and, in addition, a black ink composition. A combination of these ink compositions can provide good images having excellent reproduction of intermediate colors. In this case, "different from each other in color density" means that, in the case of the same colorant, the concentration of the colorant in the ink composition is different, and, in the case of a similar colorant, the chroma of a color yielded by the ink composition is different.

EXAMPLES

The present invention will be described in more detail with reference to the following examples, though it is not limited to these examples only.

Preparation of ink compositions

Ink compositions were prepared according to the following formulations.

In the following description, the following abbreviations were used.

DEGmBE: Diethylene glycol monobutyl ether
TEGmBE: Triethylene glycol monobutyl ether
PGmBE : Propylene glycol monobutyl ether
Olfine E1010, Olfine STG, and Olfine E104 are acetylene glycol surfactants manufactured by The Shin-Etsu Chemical Co., Ltd., and Proxel XL-2 is a preservative manufactured by ZENECA. For each of the ink compositions, ion-exchanged water was added until the total amount reached 100% by weight.

Example A

Example A1

| Yellow ink A-Y1 | |
|---|---|
| C.I. Acid Yellow 23 | 2.5 wt % |
| 2-Ethyl-4-methyl imidazole | 4.0 wt % |
| Sodium L-ascorbate | 0.1 wt % |
| Glycerin | 12.0 wt % |
| DEGmBE | 10.0 wt % |
| Olfine E1010 | 0.8 wt % |
| Triethanolamine | 0.5 wt % |
| Proxel XL-2 | 0.3 wt % |
| Cyan ink A-C1 | |
| C.I. Direct Blue 199 | 3.5 wt % |
| 2-Ethyl-4-methyl imidazole | 4.0 wt % |
| Sodium L-ascorbate | 0.5 wt % |
| Glycerin | 10.0 wt % |
| DEGmBE | 10.0 wt % |
| Olfine E1010 | 0.8 wt % |
| Triethanolamine | 0.5 wt % |
| Proxel XL-2 | 0.3 wt % |
| Magenta ink A-M1 | |
| C.I. Direct Red 75 | 3.0 wt % |
| 2-Ethyl-4-methyl imidazole | 4.0 wt % |
| Sodium L-ascorbate | 0.5 wt % |
| Glycerin | 12.0 wt % |
| DEGmBE | 10.0 wt % |
| Olfine E1010 | 0.8 wt % |
| Triethanolamine | 1.0 wt % |
| Proxel XL-2 | 0.3 wt % |

Example A2

| Yellow ink A-Y2 | |
|---|---|
| C.I. Direct Yellow 132 | 2.5 wt % |
| Imidazole | 12.0 wt % |
| Erythorbic acid | 5.0 wt % |
| Glycerin | 7.0 wt % |
| Diethylene glycol | 8.5 wt % |
| TEGmBE | 12.0 wt % |
| Olfine STG | 0.5 wt % |
| Potassium hydroxide | 0.1 wt % |
| Proxel XL-2 | 0.3 wt % |
| Cyan ink A-C2 | |
| C.I. Direct Blue 86 | 4.0 wt % |
| Glycerin | 10.0 wt % |
| Diethylene glycol | 3.0 wt % |
| TEGmBE | 12.0 wt % |
| Olfine STG | 0.5 wt % |
| Triethanolamine | 0.5 wt % |
| Proxel XL-2 | 0.3 wt % |
| Magenta ink A-M2 | |
| Dye (b-2) | 2.5 wt % |
| Imidazole | 20.0 wt % |
| Erythorbic acid | 5.0 wt % |
| Glycerin | 6.0 wt % |
| Urea | 8.5 wt % |
| TEGmBE | 12.0 wt % |
| Olfine STG | 0.5 wt % |
| Potassium hydroxide | 0.3 wt % |
| Proxel XL-2 | 0.3 wt % |

Example A3

| Yellow ink A-Y3 | |
|---|---|
| C.I. Direct Yellow 86 | 2.5 wt % |
| 2-Hydroxyimidazole | 7.0 wt % |
| Sumilizer TL | 2.0 wt % |
| Glycerin | 10.0 wt % |
| Diethylene glycol | 8.5 wt % |
| PGmBE | 7.0 wt % |
| Olfine E104 | 1.5 wt % |
| Potassium hydroxide | 0.1 wt % |
| Proxel XL-2 | 0.3 wt % |
| Cyan ink A-C3 | |
| Dye (a-3) | 4.0 wt % |
| 2-Hydroxyimidazole | 5.0 wt % |
| Sumilizer TL | 0.5 wt % |
| Glycerin | 10.0 wt % |
| 2-Pyrrolidone | 5.0 wt % |
| PGmBE | 7.0 wt % |
| Olfine E104 | 1.5 wt % |
| Triethanolamine | 1.0 wt % |
| Proxel XL-2 | 0.3 wt % |
| Magenta ink A-M3 | |
| Dye (c-1) | 2.5 wt % |
| Glycerin | 10.0 wt % |
| 2-Pyrrolidone | 5.0 wt % |
| PGmBE | 7.0 wt % |
| Olfine E104 | 1.5 wt % |
| Triethanolamine | 0.3 wt % |
| Proxel XL-2 | 0.3 wt % |

Example A4

| Yellow ink A-Y4 | |
|---|---|
| C.I. Acid Yellow 79 | 2.5 wt % |
| C.I. Direct Yellow 86 | 2.5 wt % |
| 2-Ethyl-4-methylimidazole | 15.0 wt % |
| Sodium L-ascorbate | 5.0 wt % |
| Glycerin | 12.0 wt % |
| Diethylene glycol | 3.0 wt % |
| DEGmBE | 7.0 wt % |
| Olfine E1010 | 1.5 wt % |
| Proxel XL-2 | 0.3 wt % |
| Cyan ink A-C4 | |
| C.I. Direct Blue 199 | 3.5 wt % |
| 2-Ethyl-4-methylimidazole | 15.0 wt % |
| Sodium L-ascorbate | 5.0 wt % |
| Glycerin | 10.0 wt % |
| Diethylene glycol | 2.0 wt % |
| DEGmBE | 7.0 wt % |
| Olfine E1010 | 1.5 wt % |
| Triethanolamine | 1.0 wt % |
| Proxel XL-2 | 0.3 wt % |
| Light cyan ink A-LC4 | |
| C.I. Direct Blue 199 | 0.5 wt % |
| 2-Ethyl-4-methylimidazole | 15.0 wt % |
| Sodium L-ascorbate | 5.0 wt % |
| Glycerin | 12.0 wt % |
| Diethylene glycol | 8.0 wt % |
| DEGmBE | 7.0 wt % |
| Olfine E1010 | 1.0 wt % |
| Triethanolamine | 0.2 wt % |
| Proxel XL-2 | 0.3 wt % |
| Magenta ink A-M4 | |
| Dye (b-2) | 1.5 wt % |
| C.I. Direct Red 227 | 0.5 wt % |
| 2-Ethyl-4-methylimidazole | 15.0 wt % |
| Sodium L-ascorbate | 5.0 wt % |
| Glycerin | 10.0 wt % |
| Diethylene glycol | 5.0 wt % |
| DEGmBE | 7.0 wt % |
| Olfine E1010 | 1.5 wt % |
| Triethanolamine | 0.9 wt % |
| Proxel XL-2 | 0.3 wt % |
| Light magenta ink A-LM4 | |
| Dye (b-1) | 0.2 wt % |
| 2-Ethyl-4-methylimidazole | 15.0 wt % |
| Sodium L-ascorbate | 5.0 wt % |
| Trimethylolethane | 12.0 wt % |
| Diethylene glycol | 8.0 wt % |
| DEGmBE | 7.0 wt % |
| Olfine E1010 | 1.0 wt % |
| Potassium hydroxide | 0.03 wt % |
| Proxel XL-2 | 0.3 wt % |

Example A5

| Yellow ink A-Y5 | |
|---|---|
| C.I. Direct Yellow 55 | 2.5 wt % |
| Imidazole | 25.0 wt % |
| Sumilizer GD | 5.0 wt % |
| 1,2,6-Hexanetriol | 5.0 wt % |
| Diethylene glycol | 2.0 wt % |
| TEGmBE | 12.0 wt % |
| Olfine STG | 0.5 wt % |
| Sodium hydroxide | 0.05 wt % |
| Proxel XL-2 | 0.3 wt % |

-continued

Cyan ink A-C5

| | | |
|---|---|---|
| C.I. Direct Blue 199 | 4.0 | wt % |
| 1,2,6-Hexanetriol | 7.0 | wt % |
| Diethylene glycol | 11.0 | wt % |
| Thiodiglycol | 3.0 | wt % |
| TEGmBE | 12.0 | wt % |
| Olfine STG | 0.5 | wt % |
| Triethanolamine | 0.5 | wt % |
| Proxel XL-2 | 0.3 | wt % |

Light cyan ink A-LC5

| | | |
|---|---|---|
| C.I. Direct Blue 87 | 1.0 | wt % |
| 1,2,6-Hexanetriol | 5.0 | wt % |
| Diethylene glycol | 18.0 | wt % |
| Thiodiglycol | 8.5 | wt % |
| TEGmBE | 12.0 | wt % |
| Olfine STG | 0.5 | wt % |
| Proxel XL-2 | 0.3 | wt % |

Magenta ink A-M5

| | | |
|---|---|---|
| Dye (c-1) | 2.0 | wt % |
| Imidazole | 25.0 | wt % |
| Sumilizer GD | 5.0 | wt % |
| 1,2,6-Hexanetriol | 5.0 | wt % |
| Diethylene glycol | 2.0 | wt % |
| Thiodiglycol | 3.0 | wt % |
| TEGmBE | 12.0 | wt % |
| Olfine STG | 0.5 | wt % |
| Proxel XL-2 | 0.3 | wt % |

Light magenta ink A-LM5

| | | |
|---|---|---|
| Dye (c-1) | 0.5 | wt % |
| Imidazole | 25.0 | wt % |
| Sumilizer GD | 5.0 | wt % |
| 1,2,6-Hexanetriol | 5.0 | wt % |
| Diethylene glycol | 8.5 | wt % |
| Thiodiglycol | 8.5 | wt % |
| TEGmBE | 12.0 | wt % |
| Olfine STG | 0.5 | wt % |
| Proxel XL-2 | 0.3 | wt % |

Comparative Example A1
Yellow ink A-Y6

| | | |
|---|---|---|
| C.I. Acid Yellow 23 | 2.5 | wt % |
| Glycerin | 12.0 | wt % |
| Diethylene glycol | 3.0 | wt % |
| DEGmBE | 10.0 | wt % |
| Triethanolamine | 0.5 | wt % |
| Proxel XL-2 | 0.3 | wt % |

Cyan ink A-C6

| | | |
|---|---|---|
| C.I. Direct Blue 199 | 3.5 | wt % |
| Glycerin | 10.0 | wt % |
| Diethylene glycol | 3.0 | wt % |
| DEGmBE | 10.0 | wt % |
| Triethanolamine | 0.5 | wt % |
| Proxel XL-2 | 0.3 | wt % |

Magenta ink A-M6

| | | |
|---|---|---|
| C.I. Direct Red 227 | 3.0 | wt % |
| Glycerin | 12.0 | wt % |
| Diethylene glycol | 3.0 | wt % |
| Olfine E1010 | 1.5 | wt % |
| Triethanolamine | 1.0 | wt % |
| Proxel XL-2 | 0.3 | wt % |

Comparative Example A2
Yellow ink A-Y7

| | | |
|---|---|---|
| C.I. Direct Yellow 132 | 2.5 | wt % |
| Imidazole | 25.0 | wt % |
| Erythorbic acid | 5.0 | wt % |
| Glycerin | 5.0 | wt % |
| Diethylene glycol | 2.0 | wt % |
| Proxel XL-2 | 0.3 | wt % |

Light cyan ink A-LC7

| | | |
|---|---|---|
| C.I. Direct Blue 199 | 3.0 | wt % |
| Glycerin | 10.0 | wt % |

-continued

| | | |
|---|---|---|
| Diethylene glycol | 15.0 | wt % |
| 2-Pyrrolidone | 10.0 | wt % |
| Triethanolamine | 0.5 | wt % |
| Proxel XL-2 | 0.3 | wt % |
| C.I. Direct Blue 199 | 0.5 | wt % |
| Glycerin | 10.0 | wt % |
| Diethylene glycol | 20.0 | wt % |
| 2-Pyrrolidone | 8.5 | wt % |
| Triethanolamine | 0.1 | wt % |
| Proxel XL-2 | 0.3 | wt % |

Magenta ink A-M7

| | | |
|---|---|---|
| Dye (c-1) | 2.0 | wt % |
| Glycerin | 10.0 | wt % |
| Diethylene glycol | 15.0 | wt % |
| 2-Pyrrolidone | 10.0 | wt % |
| Proxel XL-2 | 0.3 | wt % |

Light magenta ink A-LM7

| | | |
|---|---|---|
| Dye (c-1) | 0.5 | wt % |
| Glycerin | 10.0 | wt % |
| Diethylene glycol | 21.5 | wt % |
| 2-Pyrrolidone | 8.5 | wt % |
| Proxel XL-2 | 0.3 | wt % |

Evaluation test A

For the ink compositions and the ink sets thus obtained, tests 1 to 3 were carried out using the following recording media. The recording medium 1) is plain paper, and the recording media 2) to 4) are specialty papers for ink jet printers.

Recording media:
1) Xerox 4024 (Xerox Corp., U.S.A.)
2) EPSON Ink Jet Paper (Epson Hanbai Corporation)
3) EPSON Specialty Glossy Paper (Epson Hanbai Corporation)
4) EPSON Specialty Glossy Film (Epson Hanbai Corporation)

In the evaluation tests, for Examples A1 to A3 and Comparative Example A1, an ink jet printer MJ-930C (a product of Seiko Epson Corporation) was used, and, for Examples A4 and A5 and Comparative Example A2, PM-700C (a product of Seiko Epson Corporation) was used.

The lightfastness was evaluated by a lightfastness test using a xenon weather-ometer Ci35W (manufactured by Atlas Electric Device) as an acceleration tester for fastness to light containing exposure light in a visible region.

Test 1: Lightfastness-1

For each ink, monochrome blotted images were printed on the recording media 1) to 4). These print samples were subjected to a 60-hr lightfastness test using a xenon weather-ometer Ci35W (manufactured by Atlas Electric Device). The difference between the color before the test and the color after the test, $\Delta E^*_{ab}$, was determined by equation (i), and evaluated according to the following criteria.

$$\Delta E^*_{ab} = [(\Delta L^*)^2 + (\Delta a^*)^2 + (\Delta b^*)^2]^{1/2} \quad (i)$$

(Evaluation criteria)
A: Color difference $\Delta E^*_{ab}$ of not more than 5
B: Color difference $\Delta E^*_{ab}$ of more than 5 to 10
C: Color difference $\Delta E^*_{ab}$ of more than 10 to 20
NG: Color difference $\Delta E^*_{ab}$ of more than 20

Test 2: Lightfastness-2

For the ink sets of the examples and the comparative examples, blotted images of second colors (red, green, and blue) were printed on the recording media 1) to 4). These print samples were subjected to a 60-hr lightfastness test using a xenon weather-ometer Ci35W (manufactured by Atlas Electric Device). $\Delta E^*_{ab}$ between the color before the test and the color after the test was determined by equation (i) in the same manner as in Test 1, and evaluated according to the following criteria.

(Evaluation criteria)

A: Color difference $\Delta E^*_{ab}$ of not more than 5

B: Color difference $\Delta E^*_{ab}$ of more than 5 to 10

C: Color difference $\Delta E^*_{ab}$ of more than 10 to 20

Test 3: Bleeding

For the ink sets of the examples and the comparative examples, blotted images of each color were printed on recording media 1) to 4). These print samples were inspected for bleeding or uneven color mixing in boundaries of different colors. The results were evaluated according to the following criteria.

(Evaluation criteria)

A: No bleeding was found.

B: Bleeding or uneven color mixing on a level causing no practical problem was found in slight portion.

C: Significant bleeding or uneven color mixing on a level causing slight practical problem was found.

NG: Severe bleeding was found.

The evaluation results of the tests 1 to 3 were as summarized in the following table.

|  |  | <Test 1> Lightfastness-1 | | | |
|---|---|---|---|---|---|
|  | Recording medium Ink A | 1) | 2) | 3) | 4) |
| Example A1 | Y1 | B | B | B | B |
|  | C1 | A | A | A | A |
|  | M1 | A | A | A | A |
| Example A2 | Y2 | A | A | A | A |
|  | C2 | A | A | A | A |
|  | M2 | A | A | A | A |
| Example A3 | Y3 | A | A | A | A |
|  | C3 | A | A | A | A |
|  | M3 | C | C | C | B |
| Example A4 | Y4 | A | A | A | A |
|  | C4 | A | A | A | A |
|  | LC4 | A | A | A | A |
|  | M4 | A | A | A | A |
|  | LM4 | B | B | B | A |
| Example A5 | Y5 | A | A | A | A |
|  | C5 | A | A | A | A |
|  | LC5 | A | A | A | A |
|  | M5 | A | A | A | A |
|  | LM5 | A | A | A | A |
| Comparative Example A1 | Y6 | NG | NG | NG | NG |
|  | C6 | A | A | A | A |
|  | M6 | NG | NG | NG | C |
| Comparative Example A2 | Y7 | A | A | A | A |
|  | C6 | A | A | A | A |
|  | LC6 | C | C | C | C |
|  | M6 | NG | NG | NG | C |
|  | LM6 | NG | NG | NG | NG |

|  |  | <Test 2> Lightfastness-2 | | | |
|---|---|---|---|---|---|
|  | Second color | 1) | 2) | 3) | 4) |
| Example A1 | R | B | B | B | B |
|  | G | A | A | A | A |
|  | B | A | A | A | A |
| Example A2 | R | A | A | A | A |
|  | G | A | A | A | A |
|  | B | A | A | A | A |
| Example A3 | R | B | B | B | A |
|  | G | A | A | A | A |
|  | B | B | B | B | B |
| Example A4 | R | A | A | A | A |
|  | G | A | A | A | A |
|  | B | A | A | A | A |
| Example A5 | R | A | A | A | A |
|  | G | A | B | B | A |
|  | B | A | A | A | A |
| Comparative Example A1 | R | NG | NG | NG | NG |
|  | G | NG | NG | NG | NG |
|  | B | NG | NG | NG | NG |
| Comparative Example A2 | R | NG | NG | NG | C |
|  | G | A | A | A | A |
|  | B | NG | NG | NG | NG |

Second color: red = R, green = G, blue = B

|  | <Test 3> Bleeding | | | |
|---|---|---|---|---|
|  | 1) | 2) | 3) | 4) |
| Example A1 | A | A | A | A |
| Example A2 | A | A | A | A |
| Example A3 | A | A | A | A |
| Example A4 | A | A | A | A |
| Example A5 | A | A | A | A |
| Comparative Example A1 | C | B | A | A |
| Comparative Example A2 | NG | NG | NG | NG |

Example B

Example B1

| Yellow ink B-Y1 | |
|---|---|
| C.I. Acid Yellow 23 | 2.5 wt % |
| 2-Ethyl-4-methylimidazole | 4.0 wt % |
| Maltitol | 5.0 wt % |
| Glycerin | 8.0 wt % |
| DEGmBE | 10.0 wt % |
| Olfine E1010 | 0.8 wt % |
| Triethanolamine | 0.5 wt % |
| Proxel XL-2 | 0.3 wt % |

| Cyan ink BC1 | |
|---|---|
| C.I. Direct Blue 199 | 3.5 wt % |
| 2-Ethyl-4-methylimidazole | 4.0 wt % |
| Maltitol | 5.0 wt % |
| Glycerin | 7.0 wt % |
| DEGmBE | 10.0 wt % |
| Olfine E1010 | 0.8 wt % |
| Triethanolamine | 0.5 wt % |
| Proxel XL-2 | 0.3 wt % |

| Magenta ink B-M1 | |
|---|---|
| C.I. Direct Red 75 | 3.0 wt % |
| 2-Ethyl-4-methylimidazole | 4.0 wt % |
| Maltitol | 5.0 wt % |
| Glycerin | 8.0 wt % |
| DEGmBE | 10.0 wt % |
| Olfine E1010 | 0.8 wt % |
| Triethanolamine | 1.0 wt % |
| Proxel XL-2 | 0.3 wt % |

Example B2

Yellow ink B-Y2

| | |
|---|---|
| C.I. Direct Yellow 132 | 2.5 wt % |
| Imidazole | 12.0 wt % |
| Glucaric acid | 3.0 wt % |
| Glycerin | 10.0 wt % |
| Diethylene glycol | 5.5 wt % |
| TEGmBE | 12.0 wt % |
| Olfine STG | 0.5 wt % |
| Potassium hydroxide | 0.1 wt % |
| Proxel XL-2 | 0.3 wt % |

Cyan ink B-C2

| | |
|---|---|
| C.I. Direct Blue 86 | 4.0 wt % |
| Glycerin | 10.0 wt % |
| Diethylene glycol | 10.0 wt % |
| TEGmBE | 12.0 wt % |
| Olfine STG | 0.5 wt % |
| Triethanolamine | 0.5 wt % |
| Proxel XL-2 | 0.3 wt % |

Magenta ink B-M2

| | |
|---|---|
| Dye (b-2) | 2.5 wt % |
| Imidazole | 20.0 wt % |
| Glucaric acid | 7.0 wt % |
| Glycerin | 10.0 wt % |
| Urea | 8.5 wt % |
| TEGmBE | 12.0 wt % |
| Olfine STG | 0.5 wt % |
| Potassium hydroxide | 0.3 wt % |
| Proxel XL-2 | 0.3 wt % |

Example B3

Yellow ink B-Y3

| | |
|---|---|
| C.I. Direct Yellow 86 | 2.5 wt % |
| 2-Hydroxyimidazole | 7.0 wt % |
| Sorbit | 3.0 wt % |
| Glycerin | 10.0 wt % |
| Diethylene glycol | 5.5 wt % |
| PGmBE | 7.0 wt % |
| Olfine E104 | 1.5 wt % |
| Potassium hydroxide | 0.1 wt % |
| Proxel XL-2 | 0.3 wt % |

Cyan ink B-C3

| | |
|---|---|
| Dye (a-3) | 4.0 wt % |
| 2-Hydroxyimidazole | 5.0 wt % |
| Sorbit | 1.0 wt % |
| Glycerin | 10.0 wt % |
| 2-Pyrrolidone | 3.0 wt % |
| PGmBE | 7.0 wt % |
| Olfine E104 | 1.5 wt % |
| Triethanolamine | 1.0 wt % |
| Proxel XL-2 | 0.3 wt % |

Magenta ink B-M3

| | |
|---|---|
| Dye (b-2) | 2.5 wt % |
| Glycerin | 10.0 wt % |
| 2-Pyrrolidone | 5.0 wt % |
| PGmBE | 7.0 wt % |
| Olfine E104 | 1.5 wt % |
| Triethanolamine | 0.3 wt % |
| Proxel XL-2 | 0.3 wt % |

Example B4

Yellow ink B-Y4

| | |
|---|---|
| C.I. Acid Yellow 79 | 2.5 wt % |
| C.I. Direct Yellow 86 | 2.5 wt % |
| 2-Ethyl-4-methylimidazole | 10.0 wt % |
| Sucrose | 8.0 wt % |
| Glycerin | 12.0 wt % |
| Diethylene glycol | 3.0 wt % |
| DEGmBE | 7.0 wt % |
| Olfine E1010 | 1.5 wt % |
| Proxel XL-2 | 0.3 wt % |

Cyan ink B-C4

| | |
|---|---|
| C.I. Direct Blue 199 | 3.5 wt % |
| 2-Ethyl-4-methylimidazole | 10.0 wt % |
| Sucrose | 8.0 wt % |
| Glycerin | 6.0 wt % |
| Diethylene glycol | 2.0 wt % |
| DEGmBE | 7.0 wt % |
| Olfine E1010 | 1.5 wt % |
| Triethanolamine | 1.0 wt % |
| Proxel XL-2 | 0.3 wt % |

Light cyan ink B-LC4

| | |
|---|---|
| C.I. Direct Blue 199 | 0.5 wt % |
| 2-Ethyl-4-methylimidazole | 10.0 wt % |
| Sucrose | 8.0 wt % |
| Glycerin | 6.0 wt % |
| Diethylene glycol | 8.0 wt % |
| DEGmBE | 7.0 wt % |
| Olfine E1010 | 1.0 wt % |
| Triethanolamine | 0.2 wt % |
| Proxel XL-2 | 0.3 wt % |

Magenta ink B-M4

| | |
|---|---|
| Dye (b-2) | 1.5 wt % |
| C.I. Direct Red 227 | 0.5 wt % |
| 2-Ethyl-4-methylimidazole | 10.0 wt % |
| Sucrose | 8.0 wt % |
| Glycerin | 5.0 wt % |
| Diethylene glycol | 5.0 wt % |
| DEGmBE | 7.0 wt % |
| Olfine E1010 | 1.5 wt % |
| Triethanolamine | 0.9 wt % |
| Proxel XL-2 | 0.3 wt % |

Light magenta ink B-LM4

| | |
|---|---|
| Dye (b-1) | 0.2 wt % |
| 2-Ethyl-4-methylimidazole | 10.0 wt % |
| Sucrose | 8.0 wt % |
| Trimethylolethane | 10.0 wt % |
| Diethylene glycol | 8.0 wt % |
| DEGmBE | 7.0 wt % |
| Olfine E1010 | 1.0 wt % |
| Potassium hydroxide | 0.03 wt % |
| Proxel XL-2 | 0.3 wt % |

Example B5

Yellow ink B-Y5

| | |
|---|---|
| C.I. Direct Yellow 55 | 2.5 wt % |
| Imidazole | 20.0 wt % |
| Glucose | 5.0 wt % |
| 1,2,6-Hexanetriol | 5.0 wt % |
| Diethylene glycol | 2.0 wt % |
| TEGmBE | 12.0 wt % |
| Olfine STG | 0.5 wt % |
| Sodium hydroxide | 0.05 wt % |
| Proxel XL-2 | 0.3 wt % |

-continued

| Cyan ink B-C5 | |
|---|---|
| C.I. Direct Blue 199 | 4.0 wt % |
| 1,2,6-Hexanetriol | 7.0 wt % |
| Diethylene glycol | 11.0 wt % |
| Thiodiglycol | 3.0 wt % |
| TEGmBE | 12.0 wt % |
| Olfine STG | 0.5 wt % |
| Triethanolamine | 0.5 wt % |
| Proxel XL-2 | 0.3 wt % |

| Light cyan ink B-LC5 | |
|---|---|
| C.I. Direct Blue 87 | 1.0 wt % |
| 1,2,6-Hexanetriol | 5.0 wt % |
| Diethylene glycol | 18.0 wt % |
| Thiodiglycol | 8.5 wt % |
| TEGmBE | 12.0 wt % |
| Olfine STG | 0.5 wt % |
| Proxel XL-2 | 0.3 wt % |

| Magenta ink B-M5 | |
|---|---|
| Dye (b-2) | 2.0 wt % |
| Imidazole | 20.0 wt % |
| Glucose | 5.0 wt % |
| 1,2,6-Hexanetriol | 5.0 wt % |
| Diethylene glycol | 2.0 wt % |
| Thiodiglycol | 3.0 wt % |
| TEGmBE | 12.0 wt % |
| Olfine STG | 0.5 wt % |
| Proxel XL-2 | 0.3 wt % |

| Light magenta ink B-LM5 | |
|---|---|
| Dye (c-1) | 0.5 wt % |
| Imidazole | 25.0 wt % |
| Glucose | 5.0 wt % |
| 1,2-6-Hexanetriol | 5.0 wt % |
| Diethylene glycol | 8.5 wt % |
| Thiodiglycol | 8.5 wt % |
| TEGmBE | 12.0 wt % |
| Olfine STG | 0.5 wt % |
| Proxel XL-2 | 0.3 wt % |

Comparative Example B1

| Yellow ink B-Y6 | |
|---|---|
| C.I. Acid Yellow 23 | 2.5 wt % |
| Glycerin | 12.0 wt % |
| Diethylene glycol | 3.0 wt % |
| DEGmBE | 10.0 wt % |
| Triethanolamine | 0.5 wt % |
| Proxel XL-2 | 0.3 wt % |

| Cyan ink B-C6 | |
|---|---|
| C.I. Direct Blue 199 | 3.5 wt % |
| Glycerin | 10.0 wt % |
| Diethylene glycol | 3.0 wt % |
| DEGmBE | 10.0 wt % |
| Triethanolamine | 0.5 wt % |
| Proxel XL-2 | 0.3 wt % |

| Magenta ink B-M6 | |
|---|---|
| C.I. Direct Red 227 | 3.0 wt % |
| Glycerin | 12.0 wt % |
| Diethylene glycol | 3.0 wt % |
| Olfine E1010 | 1.5 wt % |
| Triethanolamine | 1.0 wt % |
| Proxel XL-2 | 0.3 wt % |

Comparative Example B2

| Yellow ink B-Y7 | |
|---|---|
| C.I. Direct Yellow 132 | 2.5 wt % |
| Imidazole | 20.0 wt % |
| Glucaric acid | 5.0 wt % |
| Glycerin | 5.0 wt % |
| Diethylene glycol | 2.0 wt % |
| Proxel XL-2 | 0.3 wt % |

| Cyan ink B-C7 | |
|---|---|
| C.I. Direct Blue 199 | 3.0 wt % |
| Glycerin | 10.0 wt % |
| Diethylene glycol | 15.0 wt % |
| 2-Pyrrolidone | 10.0 wt % |
| Triethanolamine | 0.5 wt % |
| Proxel XL-2 | 0.3 wt % |

| Light cyan ink B-LC7 | |
|---|---|
| C.I. Direct Blue 199 | 0.5 wt % |
| Glycerin | 10.0 wt % |
| Diethylene glycol | 20.0 wt % |
| 2-Pyrrolidone | 8.5 wt % |
| Triethanolamine | 0.1 wt % |
| Proxel XL-2 | 0.3 wt % |

| Magenta ink B-M7 | |
|---|---|
| Dye (b-2) | 2.0 wt % |
| Glycerin | 10.0 wt % |
| Diethylene glycol | 15.0 wt % |
| 2-Pyrrolidone | 10.0 wt % |
| Proxel XL-2 | 0.3 wt % |

| Light magenta ink B-LM7 | |
|---|---|
| Dye (b-2) | 0.5 wt % |
| Glycerin | 10.0 wt % |
| Diethylene glycol | 21.5 wt % |
| 2-Pyrrolidone | 8.5 wt % |
| Proxel XL-2 | 0.3 wt % |

Evaluation test B

Properties of the ink compositions were evaluated by the same methods as used in the evaluation test A. The results were as summarized in the following table.

| | | <Test 1> Lightfastness-1 | | | |
|---|---|---|---|---|---|
| | Recording medium | | | | |
| | Ink B | 1) | 2) | 3) | 4) |
| Example B1 | Y1 | B | B | B | B |
| | C1 | A | A | A | A |
| | M1 | A | A | A | A |
| Example B2 | Y2 | A | A | A | A |
| | C2 | A | A | A | A |
| | M2 | A | A | A | A |
| Example B3 | Y3 | A | A | A | A |
| | C3 | A | A | A | A |
| | M3 | C | C | C | B |
| Example B4 | Y4 | A | A | A | A |
| | C4 | A | A | A | A |
| | LC4 | A | A | A | A |
| | M4 | A | A | A | A |
| | LM4 | B | B | B | A |
| Example B5 | Y5 | A | A | A | A |
| | C5 | A | A | A | A |
| | LC5 | A | A | A | A |
| | M5 | A | A | A | A |
| | LM5 | A | A | A | A |

-continued

| | | | | | |
|---|---|---|---|---|---|
| Comparative Example B1 | Y6 | NG | NG | NG | NG |
| | C6 | A | A | A | A |
| | M6 | NG | NG | NG | C |
| | Y7 | A | A | A | A |
| Comparative Example B2 | C6 | A | A | A | A |
| | LC6 | C | C | C | C |
| | M6 | NG | NG | NG | C |
| | LM6 | NG | NG | NG | NG |

<Test 2>
Lightfastness-2

| | Second color | 1) | 2) | 3) | 4) |
|---|---|---|---|---|---|
| Example B1 | R | B | B | B | B |
| | G | A | A | A | A |
| | B | A | A | A | A |
| Example B2 | R | A | A | A | A |
| | G | A | A | A | A |
| | B | A | A | A | A |
| Example B3 | R | B | B | B | A |
| | G | A | A | A | A |
| | B | B | B | B | B |
| Example B4 | R | A | A | A | A |
| | G | A | A | A | A |
| | B | A | A | A | A |
| Example B5 | R | A | A | A | A |
| | G | A | B | B | A |
| | B | A | A | A | A |
| Comparative Example B1 | R | NG | NG | NG | NG |
| | G | NG | NG | NG | NG |
| | B | NG | NG | NG | NG |
| Comparative Example B2 | R | NG | NG | NG | C |
| | G | A | A | A | A |
| | B | NG | NG | NG | NG |

<Test 3>
Bleeding

| | 1) | 2) | 3) | 4) |
|---|---|---|---|---|
| Example B1 | A | A | A | A |
| Example B2 | A | A | A | A |
| Example B3 | A | A | A | A |
| Example B4 | A | A | A | A |
| Example B5 | A | A | A | A |
| Comparative Example B1 | C | B | A | A |
| Comparative Example B2 | NG | NG | NG | NG |

Second color: red = R, green = G, blue = B

Example C

Example C1

Yellow ink C-Y1

| | |
|---|---|
| C.I. Acid Yellow 23 | 2.5 wt % |
| 2-Ethyl-4-methylimidazole | 4.0 wt % |
| Compound (I-1) | 5.0 wt % |
| Glycerin | 8.0 wt % |
| DEGmBE | 10.0 wt % |
| Olfine E1010 | 0.8 wt % |
| Triethanolamine | 0.5 wt % |
| Proxel XL-2 | 0.3 wt % |

Cyan ink C-C1

| | |
|---|---|
| C.I. Direct Blue 199 | 3.5 wt % |
| 2-Ethyl-4-methylimidazole | 4.0 wt % |
| Compound (I-1) | 5.0 wt % |
| Glycerin | 7.0 wt % |
| DEGmBE | 10.0 wt % |
| Olfine E1010 | 0.8 wt % |
| Triethanolamine | 0.5 wt % |
| Proxel XL-2 | 0.3 wt % |

Magenta ink C-M1

| | |
|---|---|
| C.I. Direct Red 75 | 3.0 wt % |
| 2-Ethyl-4-methylimidazole | 4.0 wt % |
| Compound (I-1) | 5.0 wt % |
| Glycerin | 8.0 wt % |
| DEGmBE | 10.0 wt % |
| Olfine E1010 | 0.8 wt % |
| Triethanolamine | 1.0 wt % |
| Proxel XL-2 | 0.3 wt % |

Example C2

Yellow ink C-Y2

| | |
|---|---|
| C.I. Direct Yellow 132 | 2.5 wt % |
| Imidazole | 12.0 wt % |
| Compound (I-2) | 3.0 wt % |
| Glycerin | 10.0 wt % |
| Diethylene glycol | 5.5 wt % |
| TEGmBE | 12.0 wt % |
| Olfine STG | 0.5 wt % |
| Potassium hydroxide | 0.1 wt % |
| Proxel XL-2 | 0.3 wt % |

Cyan ink C-C2

| | |
|---|---|
| C.I. Direct Blue 86 | 4.0 wt % |
| Glycerin | 10.0 wt % |
| Diethylene glycol | 10.0 wt % |
| TEGmBE | 12.0 wt % |
| Olfine STG | 0.5 wt % |
| Triethanolamine | 0.5 wt % |
| Proxel XL-2 | 0.3 wt % |

Magenta ink C-M2

| | |
|---|---|
| Dye (b-2) | 2.5 wt % |
| Imidazole | 20.0 wt % |
| Compound (I-2) | 3.0 wt % |
| Glycerin | 10.0 wt % |
| Urea | 8.5 wt % |
| TEGmBE | 12.0 wt % |
| Olfine STG | 0.5 wt % |
| Potassium hydroxide | 0.3 wt % |
| Proxel XL-2 | 0.3 wt % |

Example C3

Yellow ink C-Y3

| | |
|---|---|
| C.I. Direct Yellow 86 | 2.5 wt % |
| 2-Hydroxyimidazole | 7.0 wt % |
| Compound (I-3) | 1.0 wt % |
| Glycerin | 10.0 wt % |
| Diethylene glycol | 5.5 wt % |
| PGmBE | 7.0 wt % |
| Olfine E104 | 1.5 wt % |
| Potassium hydroxide | 0.1 wt % |
| Proxel XL-2 | 0.3 wt % |

Cyan ink C-C3

| | |
|---|---|
| Dye (a-1) | 4.0 wt % |
| 2-Hydroxyimidazole | 5.0 wt % |
| Compound (I-3) | 0.5 wt % |
| Glycerin | 10.0 wt % |
| 2-Pyrrolidone | 3.0 wt % |
| PGmBE | 7.0 wt % |

-continued

| | |
|---|---|
| Olfine E104 | 1.5 wt % |
| Triethanolamine | 1.0 wt % |
| Proxel XL-2 | 0.3 wt % |
| Magenta ink C-M3 | |
| Dye (c-1) | 2.5 wt % |
| Glycerin | 10.0 wt % |
| 2-Pyrrolidone | 5.0 wt % |
| PGmBE | 7.0 wt % |
| Olfine E104 | 1.5 wt % |
| Triethanolamine | 0.3 wt % |
| Proxel XL-2 | 0.3 wt % |

Example C4

| | |
|---|---|
| Yellow ink C-Y4 | |
| C.I. Acid Yellow 79 | 2.5 wt % |
| C.I. Direct Yellow 86 | 2.5 wt % |
| 2-Ethyl-4-methylimidazole | 10.0 wt % |
| Compound (I-2) | 5.0 wt % |
| Glycerin | 12.0 wt % |
| Diethylene glycol | 3.0 wt % |
| DEGmBE | 7.0 wt % |
| Olfine E1010 | 1.5 wt % |
| Proxel XL-2 | 0.3 wt % |
| Cyan ink C-C4 | |
| C.I. Direct Blue 199 | 3.5 wt % |
| 2-Ethyl-4-methylimidazole | 10.0 wt % |
| Compound (I-2) | 8.0 wt % |
| Glycerin | 6.0 wt % |
| Diethylene glycol | 2.0 wt % |
| DEGmBE | 7.0 wt % |
| Olfine E1010 | 1.5 wt % |
| Triethanolamine | 1.0 wt % |
| Proxel XL-2 | 0.3 wt % |
| Light cyan ink C-LC4 | |
| C.I. Direct Blue 199 | 0.5 wt % |
| 2-Ethyl-4-methylimidazole | 10.0 wt % |
| Compound (I-2) | 2.0 wt % |
| Glycerin | 6.0 wt % |
| Diethylene glycol | 8.0 wt % |
| DEGmBE | 7.0 wt % |
| Olfine E1010 | 1.0 wt % |
| Triethanolamine | 0.2 wt % |
| Proxel XL-2 | 0.3 wt % |
| Magenta ink C-M4 | |
| Dye (b-2) | 1.5 wt % |
| C.I. Direct Red 227 | 0.5 wt % |
| 2-Ethyl-4-methylimidazole | 10.0 wt % |
| Compound (I-2) | 8.0 wt % |
| Glycerin | 5.0 wt % |
| Diethylene glycol | 5.0 wt % |
| DEGmBE | 7.0 wt % |
| Olfine E1010 | 1.5 wt % |
| Triethanolamine | 0.9 wt % |
| Proxel XL-2 | 0.3 wt % |
| Light magenta ink C-LM4 | |
| Dye (b-1) | 0.2 wt % |
| 2-Ethyl-4-methylimidazole | 10.0 wt % |
| Compound (I-2) | 2.0 wt % |
| Triethanolamine | 10.0 wt % |
| Diethylene glycol | 8.0 wt % |
| DEGmBE | 7.0 wt % |
| Olfine E1010 | 1.0 wt % |
| Potassium hydroxide | 0.03 wt % |
| Proxel XL-2 | 0.3 wt % |

Example C5

| | |
|---|---|
| Yellow ink C-Y5 | |
| C.I. Direct Yellow 55 | 2.5 wt % |
| Imidazole | 20.0 wt % |
| Compound (I-3) | 0.1 wt % |
| 1,2,6-Hexanetriol | 5.0 wt % |
| Diethylene glycol | 2.0 wt % |
| TEGmBE | 12.0 wt % |
| Olfine STG | 0.5 wt % |
| Sodium hydroxide | 0.05 wt % |
| Proxel XL-2 | 0.3 wt % |
| Cyan ink C-C5 | |
| C.I. Direct Blue 199 | 4.0 wt % |
| 1,2,6-Hexanetriol | 7.0 wt % |
| Diethylene glycol | 11.0 wt % |
| Thiodiglycol | 3.0 wt % |
| TEGmBE | 12.0 wt % |
| Olfine STG | 0.5 wt % |
| Triethanolamine | 0.5 wt % |
| Proxel XL-2 | 0.3 wt % |
| Light cyan ink C-LC5 | |
| C.I. Direct Blue 87 | 1.0 wt % |
| 1,2,6-Hexanetriol | 5.0 wt % |
| Diethylene glycol | 18.0 wt % |
| Thiodiglycol | 8.5 wt % |
| TEGmBE | 12.0 wt % |
| Olfine STG | 0.5 wt % |
| Proxel XL-2 | 0.3 wt % |
| Magenta ink C-M5 | |
| Dye (c-1) | 2.0 wt % |
| Imidazole | 20.0 wt % |
| Compound (I-4) | 5.0 wt % |
| 1,2,6-Hexanetriol | 5.0 wt % |
| Diethylene glycol | 2.0 wt % |
| Thiodiglycol | 3.0 wt % |
| TEGmBE | 12.0 wt % |
| Olfine STG | 0.5 wt % |
| Proxel XL-2 | 0.3 wt % |
| Light magenta ink C-LM5 | |
| Dye (c-1) | 0.5 wt % |
| Imidazole | 15.0 wt % |
| Compound (I-4) | 0.5 wt % |
| 1,2,6-Hexanetriol | 5.0 wt % |
| Diethylene glycol | 8.5 wt % |
| Thiodiglycol | 8.5 wt % |
| TEGmBE | 12.0 wt % |
| Olfine STG | 0.5 wt % |
| Proxel XL-2 | 0.3 wt % |

Comparative Example C1

| | |
|---|---|
| Yellow ink C-Y6 | |
| C.I. Acid Yellow 23 | 2.5 wt % |
| Glycerin | 12.0 wt % |
| Diethylene glycol | 3.0 wt % |
| DEGmBE | 10.0 wt % |
| Triethanolamine | 0.5 wt % |
| Proxel XL-2 | 0.3 wt % |
| Cyan ink C-C6 | |
| C.I. Direct Blue 199 | 3.5 wt % |
| Glycerin | 10.0 wt % |
| Diethylene glycol | 3.0 wt % |
| DEGmBE | 10.0 wt % |
| Triethanolamine | 0.5 wt % |
| Proxel XL-2 | 0.3 wt % |

Magenta ink C-M6

| | |
|---|---|
| C.I. Direct Red 227 | 3.0 wt % |
| Glycerin | 12.0 wt % |
| Diethylene glycol | 3.0 wt % |
| Olfine E1010 | 1.5 wt % |
| Triethanolamine | 1.0 wt % |
| Proxel XL-2 | 0.3 wt % |

Comparative Example C2

Yellow ink C-Y7

| | |
|---|---|
| C.I. Direct Yellow 132 | 2.5 wt % |
| Imidazole | 20.0 wt % |
| Compound (I-2) | 3.0 wt % |
| Glycerin | 5.0 wt % |
| Diethylene glycol | 2.0 wt % |
| Proxel XL-2 | 0.3 wt % |

Cyan ink C-C7

| | |
|---|---|
| C.I. Direct Blue 199 | 3.0 wt % |
| Glycerin | 10.0 wt % |
| Diethylene glycol | 15.0 wt % |
| 2-Pyrrolidone | 10.0 wt % |
| Triethanolamine | 0.5 wt % |
| Proxel XL-2 | 0.3 wt % |

Light cyan ink C-LC7

| | |
|---|---|
| C.I. Direct Blue 199 | 0.5 wt % |
| Glycerin | 10.0 wt % |
| Diethylene glycol | 20.0 wt % |
| 2-Pyrrolidone | 8.5 wt % |
| Triethanolamine | 0.1 wt % |
| Proxel XL-2 | 0.3 wt % |

Magenta ink C-M7

| | |
|---|---|
| Dye (c-1) | 2.0 wt % |
| Glycerin | 10.0 wt % |
| Diethylene glycol | 15.0 wt % |
| 2-Pyrrolidone | 10.0 wt % |
| Proxel XL-2 | 0.3 wt % |

Light magenta ink C-LM7

| | |
|---|---|
| Dye (c-1) | 0.5 wt % |
| Glycerin | 10.0 wt % |
| Diethylene glycol | 21.5 wt % |
| 2-Pyrrolidone | 8.5 wt % |
| Proxel XL-2 | 0.3 wt % |

Evaluation test C

Properties of the ink compositions were evaluated by the same methods as used in the evaluation test A. The results were as summarized in the following table.

<Test 1> Lightfastness-1

| | Recording medium Ink C | 1) | 2) | 3) | 4) |
|---|---|---|---|---|---|
| Example C1 | Y1 | B | B | B | B |
| | C1 | A | A | A | A |
| | M1 | A | A | A | A |
| Example C2 | Y2 | A | A | A | A |
| | C2 | A | A | A | A |
| | M2 | A | A | A | A |
| Example C3 | Y3 | A | A | A | A |
| | C3 | A | A | A | A |
| | M3 | C | C | C | B |
| Example C4 | Y4 | A | A | A | A |
| | C4 | A | A | A | A |
| | LC4 | A | A | A | A |
| | M4 | A | A | A | A |
| | LM4 | B | B | B | A |
| Example C5 | Y5 | A | A | A | A |
| | C5 | A | A | A | A |
| | LC5 | A | A | A | A |
| | M5 | A | A | A | A |
| | LM5 | A | A | A | A |
| Comparative Example C1 | Y6 | NG | NG | NG | NG |
| | C6 | A | A | A | A |
| | M6 | NG | NG | NG | C |
| Comparative Example C2 | Y7 | A | A | A | A |
| | C6 | A | A | A | A |
| | LC6 | C | C | C | C |
| | M6 | NG | NG | NG | C |
| | LM6 | NG | NG | NG | NG |

<Test 2> Lightfastness-2

| | Second color | 1) | 2) | 3) | 4) |
|---|---|---|---|---|---|
| Example C1 | R | B | B | B | B |
| | G | A | A | A | A |
| | B | A | A | A | A |
| Example C2 | R | A | A | A | A |
| | G | A | A | A | A |
| | B | A | A | A | A |
| Example C3 | R | B | B | B | A |
| | G | A | A | A | A |
| | B | B | B | B | B |
| Example C4 | R | A | A | A | A |
| | G | A | A | A | A |
| | B | A | A | A | A |
| Example C5 | R | A | A | A | A |
| | G | A | B | B | A |
| | B | A | A | A | A |
| Comparative Example C1 | R | NG | NG | NG | NG |
| | G | NG | NG | NG | NG |
| | B | NG | NG | NG | NG |
| Comparative Example C2 | R | NG | NG | NG | C |
| | G | A | A | A | A |
| | B | NG | NG | NG | NG |

<Test 3> Bleeding

| | 1) | 2) | 3) | 4) |
|---|---|---|---|---|
| Example C1 | A | A | A | A |
| Example C2 | A | A | A | A |
| Example C3 | A | A | A | A |
| Example C4 | A | A | A | A |
| Example C5 | A | A | A | A |
| Comparative Example C1 | C | B | A | A |
| Comparative Example C2 | NG | NG | NG | NG |

Second color: red = R, green = G, blue = B

Example D

Example D1

The following ingredients were mixed together and dissolved with stirring. The solutions were filtered through a 1 μm membrane filter under pressure to prepare two cyan inks having different colorant concentrations of the present example.

Cyan ink

| | |
|---|---|
| C.I. Direct Blue 199 | 3.5 wt % |
| Triethylene glycol monobutyl ether | 10.0 wt % |
| Glycerin | 10.0 wt % |
| Diethylene glycol | 11.0 wt % |
| Water | 65.4 wt % |
| Hexaamminenickel | 0.1 wt % |

Light cyan ink

| | |
|---|---|
| C.I. Direct Blue 199 | 0.9 wt % |
| Triethylene glycol monobutyl ether | 10.0 wt % |
| Glycerin | 10.0 wt % |
| Diethylene glycol | 15.0 wt % |
| Water | 63.9 wt % |
| Hexaamminenickel | 0.1 wt % |

Example D2

Ink compositions having the following formulations were prepared in the same manner as in Example 1.

Cyan ink

| | |
|---|---|
| C.I. Direct Blue 86 | 4.0 wt % |
| Diethylene glycol monomethyl ether | 10.0 wt % |
| Glycerin | 10.0 wt % |
| Ethylene glycol | 10.0 wt % |
| Water | 60.5 wt % |
| Bisglycinatodiamminenickel | 1.5 wt % |

Light cyan ink

| | |
|---|---|
| C.I. Direct Blue 86 | 1.0 wt % |
| Diethylene glycol monomethyl ether | 10.0 wt % |
| Glycerin | 10.0 wt % |
| Ethylene glycol | 13.0 wt % |
| Water | 65.0 wt % |
| Bisglycinatodiamminenickel | 1.5 wt % |

Example D3

Ink compositions having the following formulations were prepared in the same manner as in Example 1.

Cyan ink

| | |
|---|---|
| C.I. Acid Blue 249 | 3.0 wt % |
| Ethylene glycol monomethyl ether | 10.0 wt % |
| Glycerin | 10.0 wt % |
| Triethylene glycol | 8.0 wt % |
| Water | 66.0 wt % |
| Bisalaninatonickel | 3.0 wt % |

Light cyan ink

| | |
|---|---|
| C.I. Acid Blue 249 | 1.2 wt % |
| Ethylene glycol monomethyl ether | 10.0 wt % |
| Glycerin | 10.0 wt % |
| Triethylene glycol | 12.0 wt % |
| Water | 63.8 wt % |
| Bisalaninatonickel | 3.0 wt % |

Comparative Example D1

Ink compositions having the following formulations were prepared in the same manner as in Example 1.

Cyan ink

| | |
|---|---|
| C.I. Direct Blue 199 | 3.5 wt % |
| Triethylene glycol monobutyl ether | 10.0 wt % |
| Glycerin | 10.0 wt % |
| Diethylene glycol | 11.0 wt % |
| Water | 65.5 wt % |

Light cyan ink

| | |
|---|---|
| C.I. Direct Blue 199 | 0.9 wt % |
| Triethylene glycol monobutyl ether | 10.0 wt % |
| Glycerin | 10.0 wt % |
| Diethylene glycol | 15.0 wt % |
| Water | 64.0 wt % |

Comparative Example D2

Ink compositions having the following formulations were prepared in the same manner as in Example 1.

Cyan ink

| | |
|---|---|
| C.I. Direct Blue 86 | 4.0 wt % |
| Diethylene glycol monomethyl ether | 10.0 wt % |
| Glycerin | 10.0 wt % |
| Ethylene glycol | 10.0 wt % |
| Water | 66.0 wt % |

Light cyan ink

| | |
|---|---|
| C.I. Direct Blue 86 | 1.0 wt % |
| Diethylene glycol monomethyl ether | 10.0 wt % |
| Glycerin | 10.0 wt % |
| Ethylene glycol | 13.0 wt % |
| Water | 66.5 wt % |

Comparative Example D3

Ink compositions having the following formulations were prepared in the same manner as in Example 1.

Cyan ink

| | |
|---|---|
| C.I. Acid Blue 249 | 3.0 wt % |
| Ethylene glycol monomethyl ether | 10.0 wt % |
| Glycerin | 10.0 wt % |
| Triethylene glycol | 8.0 wt % |
| Water | 69.0 wt % |

Light cyan ink

| | |
|---|---|
| C.I. Acid Blue 249 | 1.2 wt % |
| Ethylene glycol monomethyl ether | 10.0 wt % |
| Glycerin | 10.0 wt % |
| Triethylene glycol | 12.0 wt % |
| Water | 66.8 wt % |

Magenta ink composition

In order to evaluate the lightfastness at a portion of mixed color of the cyan inks obtained in the above examples and comparative examples with magenta inks, magenta inks having different colorant concentrations were prepared according to the following formulations.

| | | Magenta ink | |
|---|---|---|---|
| | C.I. Acid Red 42 | | 2.5 wt % |
| | Triethylene glycol monobutyl ether | | 10.0 wt % |
| | Glycerin | | 10.0 wt % |
| | Diethylene glycol | | 11.0 wt % |
| | Water | | 66.5 wt % |
| | | Light magenta ink | |
| | C.I. Acid Red 42 | | 1.0 wt % |
| | Triethylene glycol monobutyl ether | | 10.0 wt % |
| | Glycerin | | 10.0 wt % |

| Evaluation item | Ink | | Example D1 | Example D2 | Example D3 | Comp. Example D1 | Comp. Example D2 | Comp. Example D3 |
|---|---|---|---|---|---|---|---|---|
| Amount of organonickel compound added | | | 0.1 | 1.5 | 3.0 | 0 | 0 | 0 |
| Lightfast deep ink | Single-color image of cyan ink | | A | A | A | A | A | A |
| | Portion of mixed color of cyan ink with magenta ink | | A | A | A | NG | NG | NG |
| Lightfast light ink | Single-color image of cyan ink | | A | A | A | A | A | A |
| | Portion of mixed color of cyan ink with magenta ink | | A | A A | NG | NG | NG | |
| Storage stability | | | A | A | A | A | A | A |

-continued

| Diethylene glycol | 15.0 wt % |
|---|---|
| Water | 64.0 wt % |

Evaluation test D
Lightfastness

Printing was carried out using the ink compositions by means of an ink jet printer PM-700C (tradename; manufactured by Seiko Epson Corporation). The deep and light magenta inks were used as inks for forming portions of mixed color of the magenta ink with the cyan ink. Four types of papers, that is, Ink Jet paper, glossy paper, and glossy film (all the above papers being manufactured by Seiko Epson Corporation) as specialty papers for ink jet printers and Xerox 4024 (manufactured by Xerox Corp.) as plain paper were used as recording media. Blotted images of a single color of cyan and a mixed color of cyan and magenta were printed on the four types of recording media. The print samples thus obtained were evaluated for lightfastness and storage stability.

In the lightfastness test, light was applied using a xenon weather-ometer Ci35W (manufactured by Atlas Electric Device) to the print samples for 100 hr, and the difference between color before light irradiation and color after light irradiation, $\Delta E^*_{ab}$ ($L^*a^*b^*$ color system), was measured with a GRETAG densitometer(manufactured by Kimoto Co., Ltd.). The results were evaluated according to the following criteria.

(Evaluation criteria)
A: Color difference $\Delta E^*_{ab}$ of not more than 10
B: Color difference $\Delta E^*_{ab}$ of more than 10 to 20
NG: Color difference $\Delta E^*_{ab}$ of more than 20
Storage stability The inks were placed in glass sample bottles, and the bottles were hermetically sealed, followed by storage at 20° C. (room temperature) and 70° C. for 7 days. The results were evaluated according to the following criteria.

(Evaluation criteria)
A: Under both environments, no precipitation occurred, and there was no change in properties and color tone of the ink.
B: There was a slight change in properties and color tone of the ink on a level not causing a practical problem.
NG: There was a change in properties and color tone of the ink on a level causing a practical problem.

The results were as summarized in the following table.

What is claimed is:

1. A cyan ink composition comprising a copper phthalocyanine dye, water, an organic solvent, and an imidazole derivative or a complex of nickel with a ligand selected from a group consisting of ammonia, $C_{1-6}$ alkoxy, $C_{1-6}$ alkyl-$NH_2CO_2$, and $NH_2$-$C_{1-6}$ alkyl-$CO_2$, with the proviso that, when the imidazole derivative is contained, said cyan ink composition further comprises an antioxidant, a saccharide, or a compound represented by formula (I):

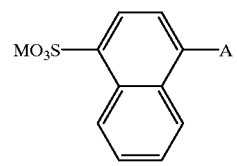

(I)

wherein
A represents a hydroxyl or amino group, said amino group being optionally substituted by a $C_{1-6}$ alkyl, a $C_{1-6}$ alkoxy, or a hydroxy $C_{1-6}$ alkyl; and
M represents lithium, sodium, potassium, ammonium, or a mono- or di-$C_{1-6}$ alkylamino.

2. The cyan ink composition according to claim 1, wherein the imidazole derivative is an imidazole which may be substituted by a hydroxyl group, a carboxyl group, or a $C_{1-6}$ alkyl group.

3. The cyan ink composition according to claim 2, wherein the imidazole derivative is selected from the group consisting of imidazole, N-methylimidazole, 2-methylimidazole, 2-hydroxyimidazole, 4-hydroxyimidazole, 5-hydroxyimidazole, pyrimidazole, 2-ethylimidazole, 2-ethyl-4-methylimidazolc, histamine, histidine, imidazolyl acetic acid, 4-methylimidazole, 4-imidazolyl acrylic acid, 4,5-imidazolyl dicarboxylic acid, and pilocarpine.

4. The cyan ink composition according to claim 1, wherein the imidazole derivative is contained in an amount of 1 to 40% by weight.

5. The cyan ink composition according to claim 1, wherein the antioxidant is selected from the group consisting of erythorbic acid, sodium erythorbate, L-ascorbic acid, sodium L-ascrobate, water-soluble derivatives of dibutylhydroxytoluene, and water-soluble derivatives of butylhydroxyanisole.

6. The cyan ink composition according to claim 5, wherein the antioxidant is contained in an amount of 0.1 to 10% by weight.

7. The cyan ink composition according to claim 1, wherein the saccharide is selected from the group consisting of monosaccharides, dissacharides, oligosaccharides, polysaccharides, and derivatives of said saccharides.

8. The cyan ink composition according to claim 1, wherein the compound represented by formula (I) is contained in an amount of 0.1 to 10% by weight.

9. The cyan ink composition according to claim 1, wherein the nickel complex is a hexaaminenickel, bisacetylacetonatonickel, bisalaninatonickel, or bisglycinatodiaminenickel.

10. The cyan ink composition according to claim 1, wherein the copper phthalocyanine dye is contained in an amount of 0.1 to 10% by weight.

11. A yellow or magenta ink composition for use with a cyan ink composition containing a copper phthalocyanine dye, said yellow or magenta ink composition comprising at least a yellow dye or a magenta dye, water, and an organic solvent and, in addition, an imidazole derivative or a complex of nickel with a ligand selected from the group consisting of ammonia, $C_{1-6}$ alkoxy, $C_{1-6}$ alkyl-$NH_2CO_2$, $NH_2$—$C_{1-6}$ alkyl-$CO_2$, and phtalocyanine, provided that when the imidazole derivative is contained, said yellow or magenta ink composition further comprises an antioxidant, a saccharide, or compound represented by formula (I):

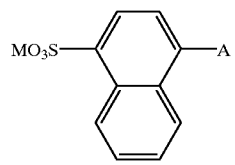

(I)

wherein

A represents a hydroxyl or amino group, said amino group being optionally substituted by a $C_{1-6}$ alkyl, a $C_{1-6}$ alkoxy, or a hydroxy $C_{1-6}$ alkyl; and M represents lithium, sodium, potassium, ammonium, or a mono- or di-$C_{1-6}$ alkylamino.

12. The ink composition according to claim 11, wherein the imidazole derivative is an imidazole which may be substituted by a hydroxyl group, a carboxyl group, or a $C_{1-6}$ alkyl group.

13. The ink composition according to claim 12, wherein the imidazole derivative is selected from the group consisting of imidazole, N-methylimidazole, 2-methylimidazole, 2-hydroxyimidazole, 4-hydroxyimidazole, 5-hydroxyimidazole, pyrimidazole, 2-ethylimidazole, 2-ethyl-4-methylimidazole, histamine, histidine, imidazolyl acetic acid, 4-methylimidazole, 4-imidazolyl acrylic acid, 4,5-imidazolyl dicarboxylic acid, and pilocarpine.

14. The ink composition according to claim 11, wherein the imidazole derivative is contained in an amount of 1 to 40% by weight.

15. The ink composition according to claim 11, wherein the antioxidant is selected from the group consisting of erythorbic acid, sodium erythorbate, L-ascorbic acid, sodium L-ascrobate, water-soluble derivatives of dibutylhydroxytoluene, and water-soluble derivatives of butylhydroxyanisole.

16. The ink composition according to claim 15, wherein the antioxidant is contained in an amount of 0.1 to 10% by weight.

17. The ink composition according to claim 11, wherein the saccharide is selected from the group consisting of monosaccharides, dissacharides, oligosaccharides, polysaccharides, and derivatives of said saccharides.

18. The ink composition according to claim 11, wherein the compound represented by formula (I) is contained in an amount of 0.1 to 10% by weight.

19. The ink composition according to claim 11, wherein the nickel complex is a hexaaminenickel, bisacetylacetonatonickel, bisalaninatonickel, bisglycinatodiaminenickel, or nickel phthalocyanine compound.

20. The ink composition according to claim 11, wherein the magenta dye is a water-soluble azo dye.

21. An ink set comprising at least the yellow or magenta ink composition according to claim 11.

22. A recording method comprising the step of depositing an ink composition onto a recording medium to perform printing, wherein the ink composition is one according to claim 1.

23. An inkjet recording method comprising the steps of: ejecting a droplet of an ink composition; and depositing the droplet onto a recording medium to perform printing, wherein the ink composition is one according to claim 11.

24. A record produced by the method according to claim 22.

25. An ink set comprising at least the cyan ink composition according to claim 1.

26. An ink set comprising at least the yellow or magenta ink composition according to claim 11 and a cyan ink composition comprising a copper phthalocyanine dye, water, an organic solvent, and an imidazole derivative or a complex of nickel with a ligand selected from the group consisting of ammonia, $C_{1-6}$ alkoxy, $C_{1-6}$ alkyl-$NH_2CO_2$, and $NH_2$—$C_{1-6}$ alkyl-$CO_2$, with the proviso that, when the imidazole derivative is contained, said cyan ink composition further comprises an antioxidant, a saccharide, or a compound represented by formula (1):

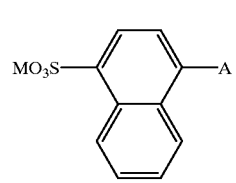

(I)

wherein

A represents a hydroxyl or amino group, said amino group being optionally substituted by a $C_{1-6}$ alkyl, a $C_{1-6}$ alkoxy, or a hydroxy $C_{1-6}$ alkyl; and M represents lithium, sodium, potassium, ammonium, or a mono- or di-$C_{1-6}$ alkylamino.

27. A recording method comprising the step of depositing an ink composition onto a recording medium to perform printing, wherein the ink composition is an ink composition consisting of the ink set according to claim 21.

28. An inkjet recording method comprising the steps of: ejecting a droplet of an ink composition; and depositing the droplet onto a recording medium to perform printing, wherein the ink composition is an ink composition consisting of the ink set of claim 21.

29. A record produced by the method according to claim 27.

* * * * *